US011818500B2

(12) United States Patent
Herdering et al.

(10) Patent No.: US 11,818,500 B2
(45) Date of Patent: Nov. 14, 2023

(54) CAMERA ARRANGEMENT

(71) Applicant: WITTE Automotive GmbH, Velbert (DE)

(72) Inventors: Markus Herdering, Bochum (DE); Reinaldo Mensch, Wuppertal (DE)

(73) Assignee: WITTE Automotive GmbH, Velbert (DE)

( * ) Notice: Subject to any disclaimer, the term of this patent is extended or adjusted under 35 U.S.C. 154(b) by 335 days.

(21) Appl. No.: 17/336,658

(22) Filed: Jun. 2, 2021

(65) Prior Publication Data
US 2021/0385411 A1    Dec. 9, 2021

(30) Foreign Application Priority Data
Jun. 4, 2020   (DE) .......................... 102020114910.7

(51) Int. Cl.
*H04N 7/10* (2006.01)
*B60R 11/04* (2006.01)
*H04N 23/54* (2023.01)

(52) U.S. Cl.
CPC ............. *H04N 7/102* (2013.01); *B60R 11/04* (2013.01); *H04N 23/54* (2023.01)

(58) Field of Classification Search
CPC ......... H04N 7/102; H04N 23/54; B60R 11/04
USPC ....................................................... 348/148
See application file for complete search history.

(56) References Cited

U.S. PATENT DOCUMENTS

| | | | |
|---|---|---|---|
| 6,566,834 B1* | 5/2003 | Albus | B25J 9/1623 318/566 |
| 6,926,103 B1* | 8/2005 | Roodenburg | E21B 19/09 175/203 |
| 11,091,081 B1* | 8/2021 | Romero | B66C 23/62 |
| 2004/0099853 A1* | 5/2004 | Verakis | B66D 1/56 254/343 |
| 2007/0242134 A1* | 10/2007 | Zernov | B63G 8/001 348/81 |
| 2010/0072442 A1* | 3/2010 | Bolton | B66C 23/48 254/325 |
| 2013/0193269 A1* | 8/2013 | Zwaan | B64D 47/08 244/118.1 |
| 2015/0116496 A1* | 4/2015 | Ottaviano | B63B 21/227 348/148 |
| 2016/0193972 A1* | 7/2016 | Wietkamp | B60R 11/04 348/148 |
| 2016/0243988 A1* | 8/2016 | Peterson | B60R 1/0617 |
| 2016/0245011 A1* | 8/2016 | Schuetz | H04N 5/77 |
| 2017/0205688 A1* | 7/2017 | Chapman | F16M 11/18 |
| 2020/0299108 A1* | 9/2020 | Van Veluw | B66C 23/185 |

FOREIGN PATENT DOCUMENTS

| | | |
|---|---|---|
| DE | 10 2013 001721 A1 | 8/2014 |
| DE | 10 2005 100 038 A1 | 7/2016 |
| DE | 10 2015 117 778 A1 | 11/2016 |
| EP | 0 635 398 A1 | 1/1995 |

(Continued)

*Primary Examiner* — Matthew David Kim
(74) *Attorney, Agent, or Firm* — Wiggin and Dana LLP

(57) ABSTRACT

The invention relates to a camera arrangement, in particular for a vehicle, having a movably mounted camera unit which can be moved between a passive position and an active position, characterized by a cable system attached to the camera unit, which is operatively connected to a cable winch that can be rotated about an axis of rotation.

15 Claims, 2 Drawing Sheets

(56) References Cited

FOREIGN PATENT DOCUMENTS

| EP | 3 040 244 A1 | 7/2016 |
| WO | 2017/164067 A1 | 9/2017 |
| WO | 2019/206572 A1 | 10/2019 |

\* cited by examiner

CAMERA ARRANGEMENT

CROSS-REFERENCE TO RELATED APPLICATION

This application claims foreign priority benefits under 35 U.S.C. § 119 to German Patent Application No. 102020114910.7 filed Jun. 4, 2020, the content of which is hereby incorporated by reference in its entirety.

FIELD OF THE INVENTION

The present invention relates to a camera arrangement, in particular for a vehicle, having a movably mounted camera unit which can be moved between a passive position and an active position.

BACKGROUND OF THE INVENTION

A camera arrangement of this type is known in principle and is used, for example, for visual capture of a region surrounding a vehicle. For this purpose, the camera unit can be moved from its passive position, in which the camera unit is accommodated in a housing protected from external influences, into an active position in order to capture the region surrounding the vehicle in the active position. In particular, a camera arrangement of the type mentioned at the outset is suitable as what is known as a backup camera, which is designed to capture an outside region behind the vehicle. The surrounding region captured by the camera unit can be shown, for example, on a display in the dashboard of the vehicle, thus making it easier to maneuver the vehicle into or through regions that are not visible. In principle, however, the camera arrangement could also capture other regions of a motor vehicle. In particular, the camera arrangement can also be used as a front camera that captures a region in front of the vehicle.

Known camera arrangements of this type are usually moved between the passive position and the active position by means of a gear drive, for example by a toothed rack, which works together with a drivable gear, being formed on the camera unit. For reasons of cost and production, the components of the gear drive are manufactured with relatively large tolerances between the components.

As soon as the components of the gear drive are driven to move the camera unit, said manufacturing tolerances lead to undesired relative movements between the components of the gear drive, which ultimately create a noise that is perceived as unpleasant.

SUMMARY OF THE INVENTION

An object of the invention is to create a camera arrangement having a camera unit that can be moved more quietly.

The object is achieved by a camera arrangement having the features of claim 1, and in particular by a cable system attached to the camera unit, which cable system is in operative connection with a cable winch that can be rotated about an axis of rotation.

The invention is based on the general idea of moving the camera unit by means of a cable system and a cable winch instead of by means of a gear drive. This has the advantage that when the camera unit is moved, due to the flexible design of the cable, less structure-borne noise is generated than with a gear drive having rigid components, so that the camera arrangement can be moved more quietly overall.

In contrast to a simple deflection pulley, the cable winch itself exerts a tensile force on the camera unit, namely via the cable system, i.e., the cable winch does the work, rather than a deflection pulley.

A movement of the camera unit between the passive position and the active position means that the camera unit can be moved reversibly between the passive position and the active position. In other words, the camera unit cannot only be moved once from the passive position into the active position, but can be moved multiple times between the two positions.

Advantageous embodiments can be found in the dependent claims, the description and the drawings.

The cable system can have a flexible cable. A flexible cable in this case also includes a braided flexible wire or a ribbon-like flat wire, which can be wound around the cable winch like a spiral spring. In principle, the cable system can comprise any flexible element which can be wound onto the cable winch or unwound from it by rotating the cable winch. A cable made of a braided and/or drawn plastics material is particularly preferably used.

The camera unit can preferably be moved into the active position by rotating the cable winch in a first direction of rotation and into the passive position by rotating the cable winch in an opposite, second direction of rotation. By means of the cable system, a tensile force can be exerted on the camera unit both by rotating the cable winch in the first direction of rotation and by rotating the cable winch in the second direction of rotation. It should be understood that the tensile force acting on the camera unit has a force component that is at least approximately parallel to the direction of movement of the camera unit.

To attach the cable system to the camera unit, the camera unit can have a first attachment point and a second attachment point for the cable system, the second attachment point being spaced apart from the first attachment point in the direction of movement of the camera unit.

According to a further embodiment, the cable system comprises a cable which is wound around the cable winch in a frictional and/or non-positive and/or positive manner. The cable can be wound around the cable winch with at least one winding. To increase the frictional and/or non-positive connection between the cable winch and the cable, the cable can be wrapped around the cable winch several times.

So that the camera unit can be moved between the active position and the passive position, one end of the cable is preferably attached to the first attachment point and the other end of the cable is attached to the second attachment point. Advantageously, when the camera unit is in the active position, a first cable portion of the cable extending between the first attachment point and the cable winch is longer than a second cable portion of the cable extending between the second attachment point and the cable winch. When the camera unit is in the passive position, the first cable portion of the cable is accordingly shorter than the second cable portion.

According to an alternative embodiment, the cable system can comprise a first cable and a second cable. Preferably, the first cable is attached at one end to the first attachment point and at the other end to the cable winch. The second cable, on the other hand, is attached at one end to the second attachment point and at the other end to the cable winch. In this case, when the camera unit is in the active position, the first cable can be wound onto the cable winch, while the second cable is preferably unwound. Correspondingly, when the camera unit is in the passive position, the second cable can be wound onto the cable winch, while the first cable is preferably unwound.

For the reversible movement of the camera unit between the active position and the passive position, the cable winch can be designed to be rotatable bidirectionally.

Furthermore, a drive, in particular a bidirectional drive, can be provided for rotating the cable winch. The drive can be encapsulated in order to make the camera arrangement even quieter. The drive is preferably designed as a self-locking drive so that no additional components are required to hold the camera unit in a desired position. In particular, the drive can drive the cable winch directly, so as to form a cable drive. In a cable drive, the drive shaft of the drive and the axis of rotation of the cable winch are identical. The advantage of such a configuration is that no further components, such as a worm gear or a gear drive, are required between the drive and the cable winch, such that the configuration of the camera arrangement is quieter and more cost-effective overall.

In principle, the cable winch can be mounted in a stationary manner on a housing, of the camera arrangement. For a particularly space-saving design of the camera arrangement, the cable winch can also be mounted on the camera unit. In order to allow the camera unit to move relative to the stationary cable winch, a guide groove can be formed on the camera unit parallel to the direction of movement of the camera unit, in which guide groove a bearing portion of a shaft of the cable winch defining the axis of rotation of the cable winch is mounted.

So that the camera unit protrudes as far as possible from the housing of the camera arrangement in the active position for optimally capturing the vehicle's surroundings, the guide groove can be formed on a web which emerges from the camera unit on a side remote from a lens of the camera unit.

The camera unit advantageously performs a rotational movement and/or translational movement during a movement between the passive position and the active position. For a simultaneous rotational and translational movement of the camera unit, it is advantageous if the guide groove is curved. In particular, a curvature of the cable winch and a curvature of the guide groove can be opposite to each other. Additionally or alternatively, the guide groove can have a larger radius of curvature than the cable winch.

In the passive position, the camera unit is preferably accommodated in a housing of the camera unit in such a way that it is inaccessible from the outside, in particular behind a hinged protective element or a hinged cover, for example.

According to a further embodiment, at least one spring element can be provided, against whose restoring force the camera unit can be moved into the active position or the passive position. In this way, the spring element can ensure a return of the camera unit into the passive position, or support it when it moves into the passive position. In principle, however, it is also conceivable that the camera unit can be moved against the restoring force of the spring element when the cable winch is rotated in the second direction of rotation, so that the camera unit can be moved from the passive position into the active position by the restoring force of the spring element.

During movement of the camera unit against the restoring force of a spring element, it is advantageous if a drive for driving the cable winch has a non-self-locking gear so that the gear of the drive can run freely when the camera unit moves as a result of the spring force.

BRIEF DESCRIPTION OF THE DRAWINGS

The invention is described below purely by way of example using an embodiment, with reference to the accompanying drawings. In the drawings.

DETAILED DESCRIPTION

Figure 1:
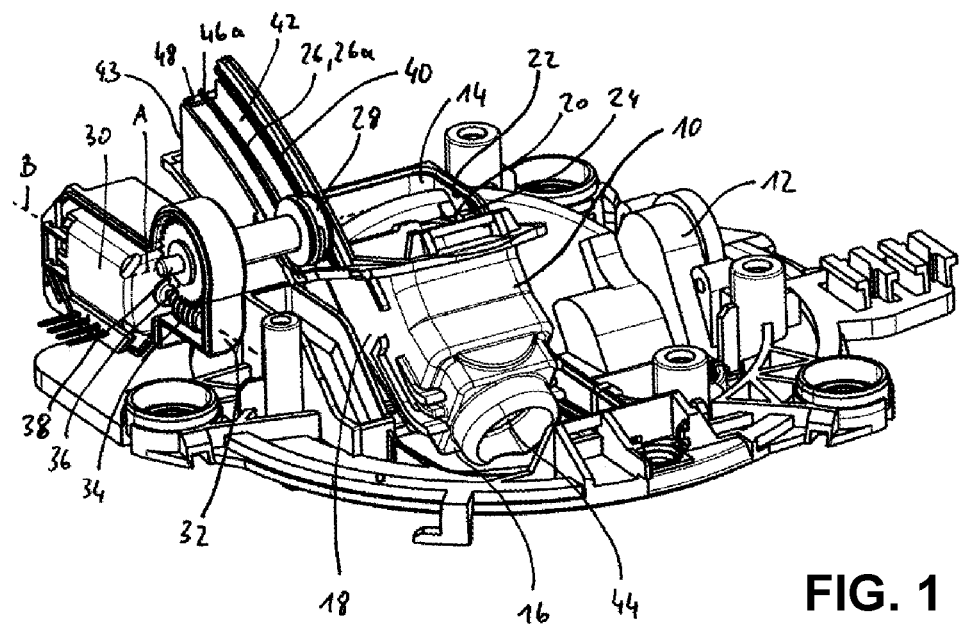
FIG. 1 is a perspective partial sectional view of a camera arrangement with the camera unit in the passive position.
Figure 2:
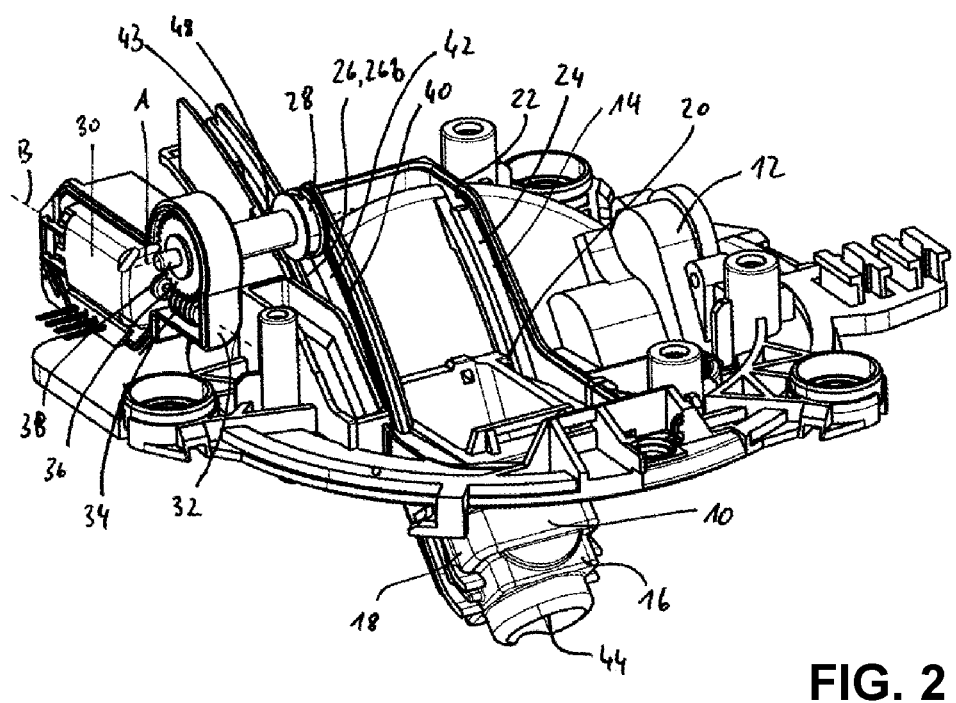
FIG. 2 shows the camera arrangement of FIG. 1 with the camera unit in the active position.
Figure 3:
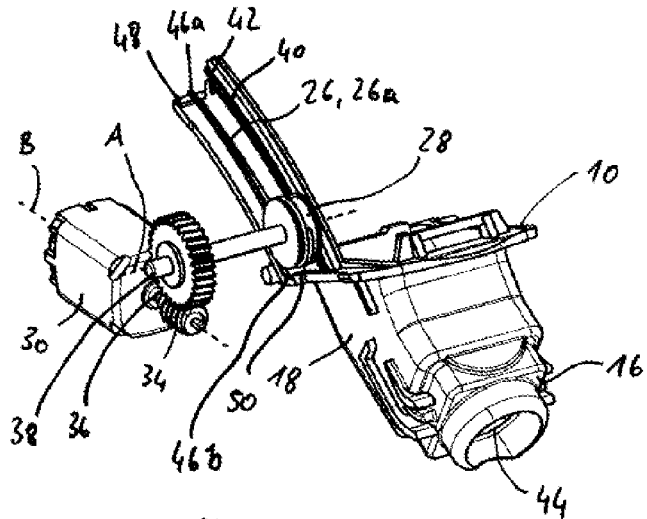
FIG. 3 is a detailed view of the camera arrangement of FIG. 1 with the camera unit in the passive position.
Figure 4:
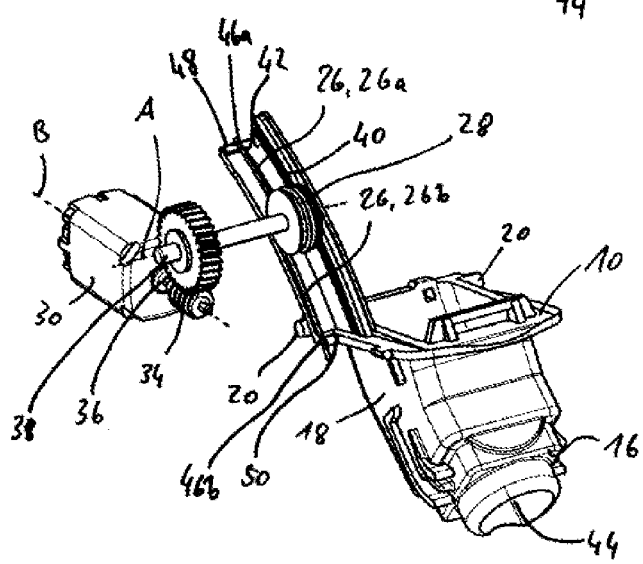
FIG. 4 is a detailed view of the camera arrangement of FIG. 1 with the camera unit in an intermediate position between the active position and the passive position.

The drawings show a camera arrangement 10 which is used to capture a region surrounding a vehicle and which is designed, for example, as a backup camera. FIGS. 1 and 2 give an overview of the camera arrangement, whereas FIGS. 3 to 5 show details of the camera arrangement 10.

Figure 5:
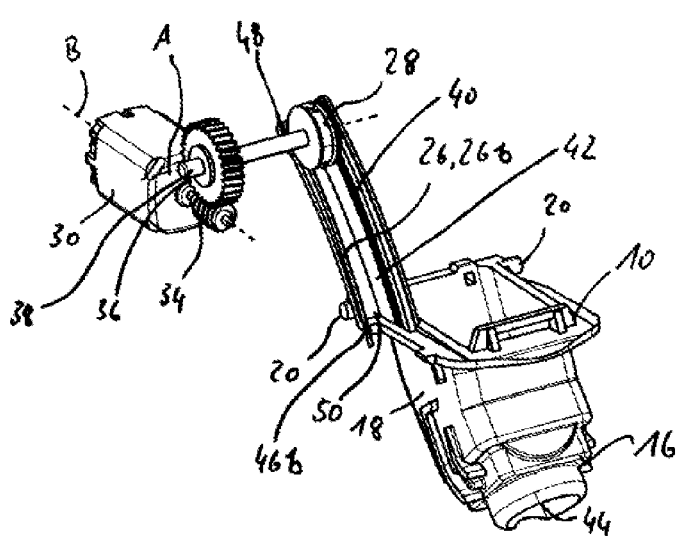
FIG. 5 is a detailed view of the camera arrangement of FIG. 1 with the camera unit in the active position.

The camera arrangement 10 shown in FIGS. 1 and 2 comprises a housing 12 with a shaft 14 in which a camera unit 16 is movably mounted to allow movement between a passive position (FIGS. 1 and 3) and an active position (FIGS. 2 and 5). In the passive position, the camera unit 16 is located in the shaft 14 and is protected from external influences, such as weather or contamination, by a hinged cover (not shown in the drawings). In the active position, the camera unit 16 is at least partially moved out of the shaft 14 for capturing the vehicle surroundings, the cover no longer covering the camera unit 16 in the active position.

The camera unit 16 extends substantially along its direction of movement and has guide elements 20 on opposite longitudinal sides 18 which, when the camera unit 16 moves, are guided in guide tracks 24 each formed on the side walls 22 of the shaft 14.

In order to move the camera unit 16 between the active position and the passive position, a cable system 26 is attached to the camera unit 16 and is in operative connection with a cable winch 28 that can be rotated about an axis of rotation A. The cable winch 28 can be rotated bidirectionally in order to allow a reversible movement of the camera unit 16 between the active position and the passive position.

A drive 30, which in the illustrated embodiment is designed as a bidirectional drive 30 for bidirectional rotation of the cable winch 28, is provided for rotating the cable winch 28. To minimize noise, the drive 30 is accommodated in an encapsulation 32. in FIGS. 1 and 2, the encapsulation 32 is depicted in a partial cutaway view to better illustrate the drive 30.

As can be seen from FIGS. 1 and 2, the drive 30 comprises a worm gear with a worm thread 34, which is in operative connection with the cable winch 28 via a gearwheel 36. A drive axis B having the worm thread 34 is oriented at least approximately perpendicular to the axis of rotation A of the cable winch 28. In this context, it should be mentioned that the axis of rotation A of the cable winch 28 is itself oriented at least approximately perpendicular to the direction of movement of the camera unit 16.

In principle, the drive 30 could also drive the cable winch 28 directly, i.e., without an interposed worm gear. The drive axis B of the drive 30 and the axis of rotation A of the cable winch 28 are identical, so that the drive 30 and the cable winch 28 together form a cable drive. Since a worm gear which is subject to tolerances is not required in a cable drive of this type, the camera arrangement 10 can be designed to be quieter and more cost-effective overall.

The drive 30 is preferably designed as a self-locking drive 30, as a result of which the camera unit 16 can be held in a desired position.

The cable winch 28 is mounted both on the drive side and on a side of the cable winch 28 facing away from the drive 30. On the side of the cable winch 28 facing away from the drive 30, a bearing portion, which cannot be seen in the drawings, of a shaft 38 of the cable winch 28 defining the axis of rotation A of the cable winch 28 is mounted in a guide groove 40. The guide groove 40 runs parallel to the direction of movement of the camera unit 16 and is formed on a web 42 which emerges from the camera unit 16 on a side remote from a lens 44 of the camera unit 16 and which is guided in a guide track 43 formed on the housing 12. As can be seen from FIG. 1 to 5, the web 42 emerges laterally from the camera unit 16 on a longitudinal side 18 of the camera unit 16 facing the drive 30. In principle, however, the guide groove 40 could also be formed directly on the longitudinal side 18 of the camera unit 16 facing the drive 30.

The web 42 and the guide groove 40 are curved so that the camera unit 16 performs both a translational movement and a rotational movement about an axis of rotation (not shown in the drawings) when moving between the passive position and the active position. The axis of rotation is oriented at least approximately perpendicular to the translation direction, which in turn is oriented at least approximately parallel to the direction of movement of the camera unit 16. In principle, however, the camera unit 16 can also perform a purely translational movement or a purely rotational movement when it moves between the passive position and the active position. In the case of a purely translational movement, the guide groove 40 or the web 42 can be straight. In contrast, the guide groove 40 or the web 42 can be curved around the axis of rotation in the case of a purely rotational movement of the camera unit 16.

As can be seen particularly with reference to FIG. 3 to 5, a curvature of the cable winch 28 and a curvature of the guide groove 40 or of the web 42 are opposite to each other. In addition, the guide groove 40 or the web 42 has a larger radius of curvature than the cable winch 28.

In the present embodiment, the cable system 26 comprises a first cable 26a and a second cable 26b. The first cable 26a and the second cable 26b can be made of a braided and/or drawn plastics material.

The first cable 26a is attached at one end to a first attachment point 46a on the camera unit 16 and at the other end to the cable winch 28 (FIGS. 3 and 4). In a comparable manner, the second cable 26b is attached at one end to a second attachment point 46b on the camera unit 16 that is spaced apart from the first attachment point 46a in the direction of movement of the camera unit 16, and at the other end to the cable winch 28 (FIGS. 4 and 5). Both the first attachment point 46a and the second attachment point 46b are provided on the web 42, the first attachment point 46a being at an end 48 of the web 42 remote from the lens 44 and the second attachment point 46b being at an origin 50 of the web 42, According to a second embodiment of the camera arrangement 10, not shown in the drawings, the cable system 26 can also comprise only one cable. One end of the cable is attached to the first attachment point 46a and the other end of the cable is attached to the second attachment point 46b. The cable can be made of a braided and/or drawn plastics material.

The cable is preferably wound around the cable winch 28 in a frictional and/or non-positive manner. Additionally or alternatively, the cable can also be wound around the cable winch 28 in a positive manner. For this purpose, the cable winch 28 can have at least one groove, in particular a spiral groove, in which the wound cable is received in a positive manner.

Furthermore, according to a third embodiment of the camera arrangement 10, also not shown, it is conceivable that at least one spring element is provided, against whose restoring force a tensile force is exerted on the camera unit 16 by means of the cable system 26 when the cable winch 28 is rotated in a first direction of rotation. In this way, the camera unit 16 can be moved in a first direction of movement as a result of rotating the cable winch 28 in the first direction of rotation, and moved back in a second direction of movement opposite to the first direction of movement by the restoring force of the spring element.

The functioning of the camera arrangement 10 will now be described below with reference to the first embodiment shown in the drawings.

The drive 30 is activated by a control signal and the cable winch 28 is rotated via the worm gear. Depending on the direction of rotation of the cable winch 28, one of the two cables 26a, 26b is wound onto the cable winch 28, such that a tensile force acts on the corresponding cable 26a, 26b and a distance between the cable winch 28 and the given attachment point 46a, 46b is reduced, i.e., the given attachment point 46a, 46b is moved in the direction of the cable winch 28. Specifically, the camera unit 16 is thereby brought into the active position in a first direction of rotation of the cable winch 28, and into the passive position in an opposite, second direction of rotation of the cable winch 28. In the embodiment shown, the cable winch 28 is rotated clockwise in the first direction of rotation, looking in the direction of the guide groove 40. Correspondingly, the cable winch 28 is rotated counterclockwise in the second direction of rotation, looking in the direction of the guide groove 40.

It can be seen from FIGS. 1 and 3 that when the camera unit 16 is in the passive position, the second cable 26b is wound onto the cable winch 28. In contrast, the first cable 26a is unwound from the cable winch 28. From FIGS. 2 and 5, it can be seen that when the camera unit 16 is in the active position, the first cable 26a is wound onto the cable winch 28 and the second cable 26b is unwound. If the camera unit 16 is in an intermediate position between the active position and the passive position, both cables 26a, 26b are partially wound onto the cable winch 28 and partially unwound (FIG. 4).

In the camera arrangement 10 according to the second embodiment, when the camera unit 16 is in the active position, a first cable portion of the cable extending between the first attachment point 46a and the cable winch 28 is longer than a second cable portion of the cable extending between the second attachment point 46b and the cable winch 28. In addition, when the camera unit 16 is in the passive position, the first cable portion of the cable is shorter than the second cable portion.

LIST OF REFERENCE SYMBOLS 10 camera arrangement
12 housing
14 shaft 16 camera unit
18 longitudinal side
20 guide element
22 side wall
24 guide track
26 cable system
26a, 26b first cable, second cable
28 cable winch
30 drive
32 encapsulation
34 worm thread
36 gear
38 shaft
40 guide groove
42 web
43 guide track
44 lens
46a, 46b first attachment point, second attachment point
48 remote end
50 origin
A axis of rotation
B drive axle

The invention claimed is:

1. A camera arrangement, the camera arrangement having a movably mounted camera unit which can be moved between a passive position and an active position, further having a cable system which is attached to the camera unit and which is in operative connection with a cable winch, with the cable winch being able to be rotated about an axis of rotation,
   wherein the camera unit has a first attachment point and a second attachment point for the cable system, the second attachment point being spaced apart from the first attachment point in the direction of movement of the camera unit,
   wherein the cable system comprises a cable which is wound around the cable winch in a frictional and/or non-positive and/or positive manner and one end of the cable is attached to the first attachment point and the other end of the cable is attached to the second attachment point, and
   wherein when the camera unit is in the active position, a first cable portion of the cable extending between the first attachment point and the cable winch is longer than a second cable portion of the cable extending between the second attachment point and the cable winch, and when the camera unit is in the passive position, the first cable portion of the cable is shorter than the second cable portion.

2. The camera arrangement according to claim 1, wherein the camera unit can be moved into the active position by rotating the cable winch in a first direction of rotation, and into the passive position by rotating the cable winch in an opposite, second direction of rotation.

3. The camera arrangement according to claim 2, wherein, by means of the cable system, a tensile force can be exerted on the camera unit both by rotating the cable winch in the first direction of rotation and by rotating the cable winch in the second direction of rotation.

4. The camera arrangement according to claim 1, wherein the cable system comprises a cable which is wound around the cable winch in a frictional and/or non-positive and/or positive manner.

5. The camera arrangement according to claim 1, wherein the cable system comprises a first cable and a second cable, the first cable being attached at one end to the first attachment point and at the other end to the cable winch, and the second cable being attached at one end to the second attachment point and at the other end to the cable winch.

6. The camera arrangement according to claim 5, wherein, when the camera unit is in the active position, the first cable is wound onto the cable winch, and when the camera unit is in the passive position, the second cable is wound onto the cable winch.

7. The camera arrangement according to claim 1, wherein the cable winch can be rotated bidirectionally.

8. The camera arrangement according to claim 1, further comprising a drive for rotating the cable winch.

9. The camera arrangement according to claim 8, wherein the drive is a bidirectional drive.

10. The camera arrangement according to claim 1, wherein a guide groove is formed on the camera unit parallel to the direction of movement of the camera unit, in which guide groove a bearing portion of a shaft of the cable winch defining the axis of rotation of the cable winch is mounted.

11. The camera arrangement according to claim 10, wherein the guide groove is curved.

12. The camera arrangement according to claim 11, wherein a curvature of the cable winch and a curvature of the guide groove are opposite to each other.

13. The camera arrangement according to claim 10, wherein the guide groove has a larger radius of curvature than the cable winch.

14. The camera arrangement according to claim 10, wherein the guide groove is formed on a web which emerges from the camera unit on a side remote from a lens of the camera unit.

15. The camera arrangement according to claim 1, wherein at least one spring element is provided, against whose restoring force the camera unit can be moved into the active position or the passive position.

* * * * *